United States Patent [19]

Guazzo et al.

[11] Patent Number: 4,481,381
[45] Date of Patent: Nov. 6, 1984

[54] DEVICE FOR PREVENTING DAMAGE TO A SUBMARINE CABLE AT THE POINT WHERE IT LEAVES AN EQUIPMENT CASING DURING PASSAGE ROUND THE CABLE DRUM AND OVER THE DAVIT

[75] Inventors: Lucien Guazzo; Jean-Patrick Vives, both of Calais, France

[73] Assignee: Les Cables de Lyon, Clichy, France

[21] Appl. No.: 405,016

[22] Filed: Aug. 4, 1982

[30] Foreign Application Priority Data

Aug. 4, 1981 [FR] France .................................. 81 15111

[51] Int. Cl.³ .................... H02G 15/115; H02G 15/14; H01R 13/56
[52] U.S. Cl. ................................. 174/135; 174/70 S; 174/91; 339/101
[58] Field of Search ......................... 174/70 S, 91, 135; 254/134.3 SC; 339/101, 102 R, 103 R

[56] References Cited

U.S. PATENT DOCUMENTS

| | | | |
|---|---|---|---|
| 1,640,744 | 8/1927 | Zapf ..................................... | 174/135 |
| 2,287,163 | 6/1942 | Bishop ........................... | 174/70 S X |
| 2,727,088 | 12/1955 | La Wall ........................... | 339/101 X |
| 3,366,917 | 1/1968 | Karol .................................. | 339/101 |
| 3,786,397 | 1/1974 | Bridges ............................. | 339/92 M |

FOREIGN PATENT DOCUMENTS

| | | | |
|---|---|---|---|
| 568340 | 1/1923 | France ................................ | 174/135 |
| 421522 | 5/1947 | Italy ...................................... | 174/91 |
| 720962 | 12/1954 | United Kingdom .............. | 174/74 A |
| 787702 | 12/1957 | United Kingdom .............. | 174/70 S |
| 1181939 | 2/1970 | United Kingdom ................ | 339/101 |

Primary Examiner—Laramie E. Askin
Attorney, Agent, or Firm—Sughrue, Mion, Zinn, Macpeak & Seas

[57] ABSTRACT

A device for preventing damage to a submarine cable at the point where it leaves an equipment casing during passage round the cable drum and over the davit, and consisting of a chocking member (5) on each side of the casing (2) surrounding the cable (1) from its outlet from the casing to a point of contact of the cable with the drum (3), said chocking member being in the form of a body of revolution about the cable axis of generally pear-shaped configuration when unstressed and having a swollen part (6) at the casing end, said chocking member occupying all the space between the cable (1) and the drum (3) when the cable is wound on the drum, the swollen part of the chocking member when unstressed having a radius at least equal to the distance (d) between the cable and the drum at the outlet from the casing. The chocking member may be a sleeve of a strong and flexible material; it may also consist of a stack of elementary chocking members.

3 Claims, 10 Drawing Figures

FIG. 1 FIG. 2
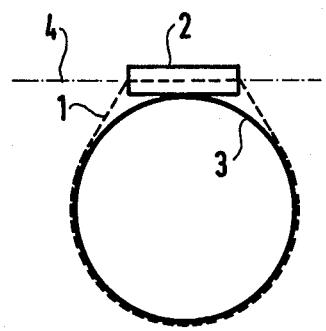
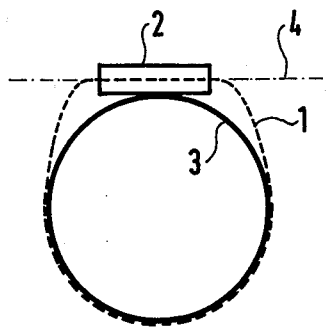
FIG. 3
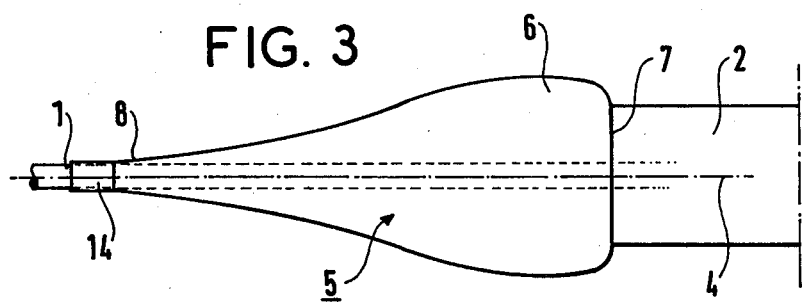
FIG. 4
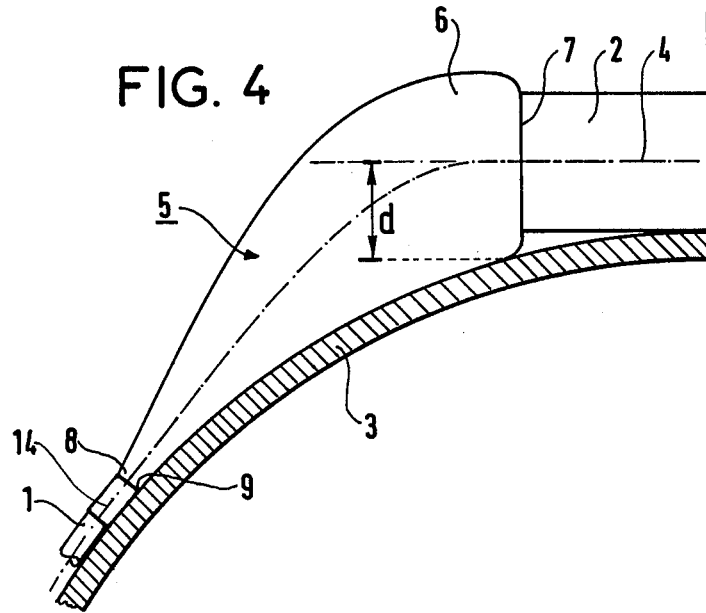

DEVICE FOR PREVENTING DAMAGE TO A SUBMARINE CABLE AT THE POINT WHERE IT LEAVES AN EQUIPMENT CASING DURING PASSAGE ROUND THE CABLE DRUM AND OVER THE DAVIT

FIELD OF THE INVENTION

The invention concerns a device for preventing damage to a submarine cable at the point where it leaves an equipment casing during passage round the cable drum and over the davit, said cable being connected directly to the casing and the device comprising a chocking member on each side of the casing and surrounding the cable from the outlet from the casing to a point of contact between the cable and the cable drum, said chocking member being in the form of a body of revolution about the cable axis of generally pear-shaped configuration when unstressed and having a swollen part at the casing end, said chocking member occupying all the space between the cable and the drum when the cable is wound on the drum, the swollen part of the chocking member when unstressed having a radius at least equal to the distance between the cable and the drum at the outlet from the casing, the chocking member being tapered at the other end and having at the contact point a diameter approximately the same as that of the cable.

BACKGROUND OF THE INVENTION

A submarine link comprises a cable and equipment casings in the form of either repeaters or repair boxes. These components (cable and casings) sometimes have very different diameters, giving rise to problems during the various handling operations to which they are subjected. At the outlet from a repeater, for example, the external armouring of the cable is removed, which confers a certain degree of flexibility at the outlet from the casing. This may have damaging effects for the cable if it is subjected, at the point where it leaves the casing, to a load imposing on it a direction at an angle to the casing axis. This sudden change of direction between the part of the cable internal to the casing and extending along the axis thereof and the part of the cable external to the casing causes cable damage, whether the cable is a conventional one, that is to say one comprising only electrical conductors, or an optical fibre cable.

It is known from French Pat. No. 568 340 to fit the ends of cables with chocking members in the form of a body of revolution having, when unstressed, a generally pear-shaped configuration. These chocking members do no entirely cover the joint between two cable ends, however, after a repair, for example. To entirely cover the joint considerable moulding equipment is required and could not be installed on a cable-laying ship.

SUMMARY OF THE INVENTION

The present invention overcomes this problem by providing two chocking members which nest one within the other to cover the entire joint.

The present invention is characterised in that the two chocking members nest one within the other over a central part of the casing so that the external surfaces of the chocking members join perfectly in the central part.

Other characteristics and advantages of the invention will emerge from the following description of embodiments of the invention, illustrated by the accompanying figures.

BRIEF DESCRIPTION OF DRAWINGS

FIG. 1 is a schematic representation of a cable and a casing wound onto a drum and showing the undesirable position of the cable at the outlet from the casing if no precaution is taken, FIG. 2 is a schematic representation showing the position which the cable should adopt at the outlet from the casing when wound on a drum to avoid any damage, FIG. 3 shows the device in accordance with the invention fitted to an unwound submarine cable, FIG. 4 shows a wound submarine cable fitted with the device shown in FIG. 3.

DESCRIPTION OF PREFERRED EMBODIMENTS

Figure 5:
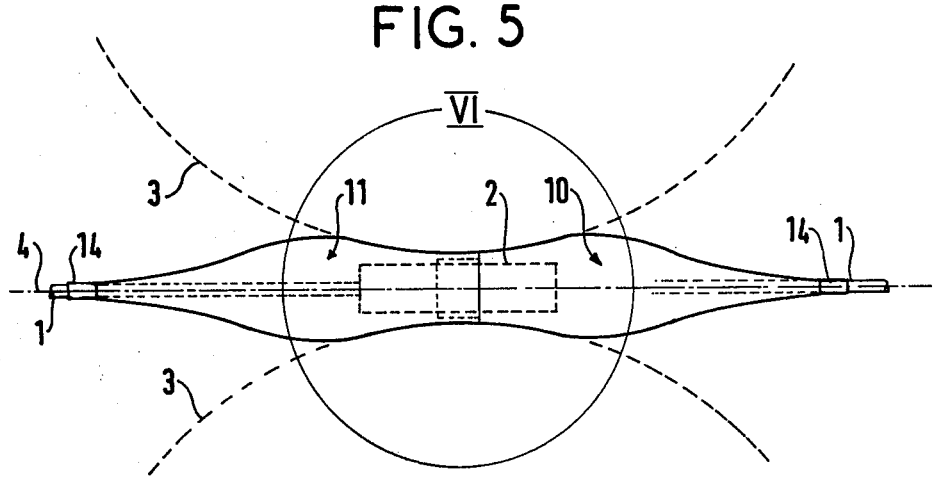
FIG. 5 shows an alternative embodiment of the invention fitted to an unwound submarine cable.

FIG. 1 shows a submarine cable 1, an equipment casing 2 and a cable drum 3. The cable is a submarine cable and the casing is either a repeater or a repair box; the casing is of generally cylindrical shape, having a length of the order of a few tens of centimeters, 50 centimeters, for example, and a diameter of the order of 10 centimeters; the drum has a diameter of the order of 2 to 3 meters, the drums commonly used having a diameter of 1.8 meters or 3 meters. FIG. 1 shows the position which the submarine cable would adopt relative to the casing, on each side thereof, it no precautions were taken to prevent the submarine cable lying at an angle to the longitudinal axis 4 of the casing at the point at which it leaves the casing, this angle being the cause of damage to the submarine cable.

Like FIG. 1, FIG. 2 shows a submarine cable 1 and a casing 2 wound on a drum 3. In this figure the submarine cable leaves the casing along longitudinal axis 4 and comes into contact with the drum by virtue of progressive curvature. Thus the submarine cable is at a null angle to the longitudinal axis of the casing at the point at which it leaves same; in conventional practice this is achieved either through the use of articulated parts such as universal joints, or by external reinforcing of the cable so as to give it a degree of rigidity such that a minimum radius of curvature acceptable for the submarine cable is adhered to.

Articulated parts or reinforcements of the submarine cable are naturally provided on each side of the casing.

FIG. 3 shows the device in accordance with the invention fitted to an unwound submarine cable, and FIG. 4 shows a submarine cable fitted with the device in accordance with the invention, wound onto a drum. A sleeve 5 of a strong flexible material, such as rubber, i.e. neoprene or silicone, for example, surrounds submarine cable 1. This sleeve is a body of revolution and has a longitudinal hole of the same diameter as the cable; it is threaded over the cable prior to connecting the cable to casing 2, this connection being made directly, without using articulated parts such as universal joints, for example. The sleeve is of elongated pear shape with a swollen end 6 at the end of casing 2, the sleeve coming into contact with the end 7 of the casing. A tapered end 8 of the sleeve has a diameter slightly greater than that of the cable, whereas the swollen part has a radius at least equal to the distance d separating the longitudinal axis 4 of the casing from the drum, this distance being measured at end 7 of the casing. The length of the sleeve from end 7 of the casing with which it is in contact to its tapered end 8 is equal to the length of submarine cable between the point at which it leaves casing 2 and the point 9 at which it comes into contact with the drum. To prevent the sleeve moving when the cable is wound, a retaining ring 14 is fixed to the cable at the tapered end 8 of the sleeve. With drums of diameter between 1.80 meters and 3 meters the length of the sleeve is of the order of 60 centimeters to 1 meter. In FIG. 3 sleeve 5 is unstressed, the axis of submarine cable 1 being aligned with longitudinal axis 4 of casing 2. In FIG. 4 sleeve 5 is stressed; it comes into contact with drum 3 so that by virtue of its swollen part 6 the cable leaves the casing in the direction of longitudinal axis 4, and progressively curves until it is in contact with drum 3 at point 9, sleeve 5 being in contact with the drum from end 7 of the casing to contact point 9. Sleeve 5 is naturally deformed when stressed; for this reason it must be of a material which is both strong and sufficiently flexible to deform without crushing, as this would impose on the cable at the point at which it leaves the casing a direction at a non-null angle to the longitudinal axis of the casing. To satisfy these requirements the material of which the sleeve is constituted must have very low and preferably zero compressibility in the radial direction, so as to properly fulfil its function as a chocking member between the cable and the drum.

The cable is naturally provided with a sleeve of this kind on each side of casing 2; the sleeve may be fixed to the cable, after connection of the cable to the casing, by any known means, by being bonded to the cable, for example.

Figure 6:
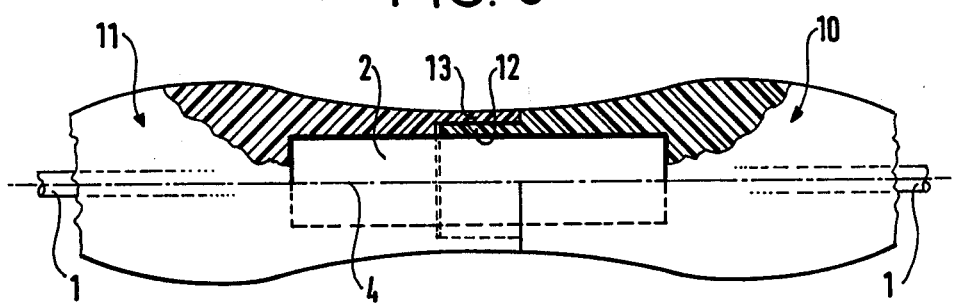
FIG. 6 shows part of FIG. 5, within the circle VI, in more detail and partially cut away.
Figure 7:
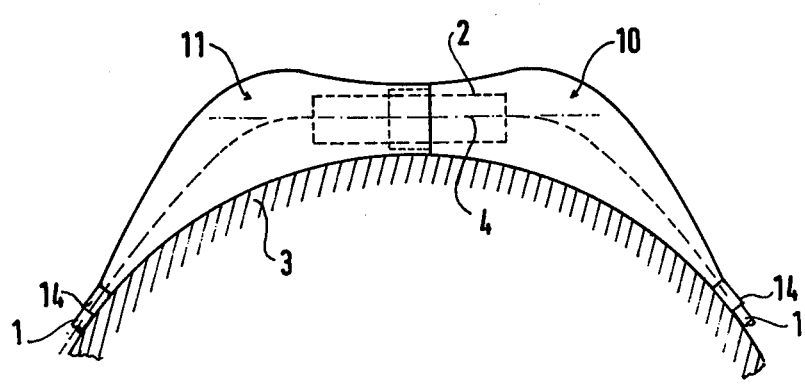
FIG. 7 shows a moulded submarine cable fitted with the device shown in FIG. 5.

FIGS. 5, 6 and 7 show a variant of the device shown in FIG. 3, FIG. 5 showing a casing and a sleeve on each side, the sleeves covering the casing and having portions nesting one within the other and being unstressed, that is to say with the cable unwound. FIG. 6 shows the nesting of the sleeves to a larger scale and FIG. 7 shows the cable and sleeves of FIG. 5 wound on a drum.

In these figures, sleeves 10 and 11, like sleeve 5 of FIG. 3, are generally pear-shaped, but they do not terminate in the same way against the end 7 of the casing like that in FIG. 3; they extend around the casing which they surround while filling the space between the casing and drum 3, shown in dashed line in FIG. 5 as this figure shows submarine cable 1, casing 2 and sleeves 10 and 11 not wound on the drum, the cable lying along the longitudinal axis of the casing on each side of the casing and the sleeve being unstressed. Sleeves 10 and 11 overlap, nesting one within the other, the end 13 of sleeve 11 covering, over the central part of the casing, the end 12 of sleeve 10, so that the surfaces of sleeves 10 and 11 interconnect without discontinuity over the central part of the casing. In practice, ends 12 and 13 have the same thickness. Although the total thickness of ends 12 and 13 is not of particular importance, for manufacturing reasons this thickness will be at least equal to one-tenth of the casing diameter. Sleeves 10 and 11 may or may not be fixed to the casing; they may be fixed to the cable by any known means, bonding, for example, in the area in which ends 12 and 13 overlap; they may be fixed around the casing by banding using metallic or non-metallic bands, or bonded and banded, so as to render them solid with the casing and to avoid them moving under the effect of the loads to which they are subjected when the cable/sleeves/casing assembly is wound onto the drum, as shown in FIG. 7.

Figure 8:
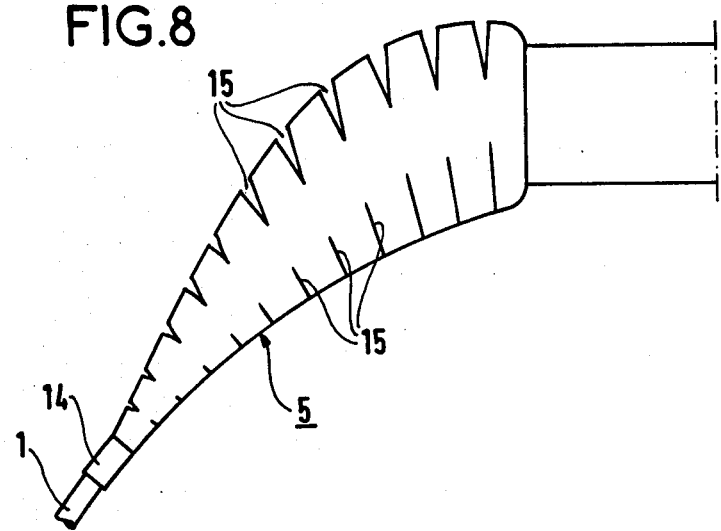
FIG. 8 shows a wound submarine cable fitted with a variant of the device shown in FIG. 3.

FIG. 8 shows a further variant of the device shown in FIG. 3. In this variant the sleeve comprises radial grooves 15, the depth and width of which depend on the material employed. The circular grooves are preferably of V-shape.

In the case of the sleeves shown in FIGS. 5, 6 and 7, these radial grooves would be formed only in that part of each sleeve not covering the casing.

Figure 9:
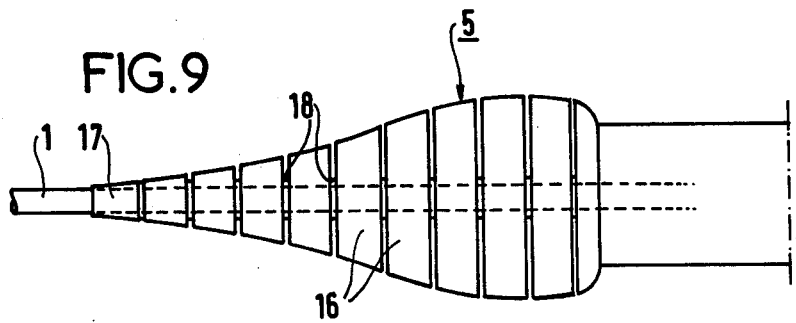
FIG. 9 shows an unwound submarine cable fitted with a further variant of the device shown in FIG. 3.

FIG. 9 shows a further variant of the device shown in FIG. 3. In this variant the sleeve comprises a stack of washers 16 with parallel surfaces, the number of which is essentially dependent on the diameter of the drum. The stack of washers naturally reconstitutes the tapering pear shape. The last washer 17 of the tapered part may constitute the retaining ring. This retaining ring may be fixed to the cable in such a way as to leave some play between the washers; a spacer washer 18 as shown in FIG. 9 may also be inserted between the washers.

Figure 10:
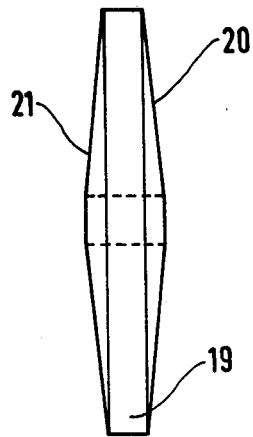
FIG. 10 shows an elementary chocking member of the variant shown in FIG. 9.

FIG. 10 shows a variant of the washer shown in FIG. 9. In FIG. 10 the washer 19 does not have parallel surfaces but is in the form of a cylinder terminated at each end by the frustum of a cone 20, 21, giving the stack of washers the overall form of a sleeve with V-shaped radial grooves.

In the case of the sleeves shown in FIGS. 5, 6 and 7 the washers of FIGS. 9 and 10 would be used only to constitute that part of each sleeve not covering the casing.

The washer shown in FIGS. 9 and 10 would be of a strong and flexible material or of a metal resistant to marine corrosion. Where spacer washers were used these would likewise be of a material resistant to marine corrosion.

The sleeves which constitute the object of the invention, which must have a null or very low compressibility in the radial direction, thus act as chocking members between the cable and the drum. In the case of the variants shown in FIGS. 9 and 10 the washers constitute elementary chocking members the stack of which constitutes a tapered pear-shaped sleeve.

The chocking members in accordance with the invention permit the elimination of articulated parts such as universal joints generally used at the casing outlet, simplifying the connection and reducing the overall size of the casing; the use of chocking members is also less costly than the use of universal joints.

The invention is naturally not limited to the embodiments described and represented; thus any other arrangement for the nesting of sleeves 10 and 11 may be adopted without departing from the scope of the invention.

We claim:

1. A device for preventing damage to a submarine cable connected directly to a casing during the cable and casing wrapping round a cylindrical drum, said casing having a diameter in excess of that of said cable, such that said cable is spaced from said drum over a given cable length at the outlet of said cable from said casing at each end of said casing, said device comprising two chocking members for positioning at the respective ends of said casing, each chocking member, when unstressed, being in the form of a hollow, generally pear-shaped body of revolution symmetrical about its axis, each pear-shaped body comprising a swollen part for positioning at a respective end of the casing and a tapered part extending from the swollen part for surrounding the cable, said swollen part having a radius of such size that the swollen part, in use, will span the distance between the cable and the drum at the outlet of the cable from the casing and said tapered part having a diameter at the end thereof remote from the swollen part approximately the same as that of the cable on which it is to be applied, each chocking member being of such size that when installed on the cable and casing and when the cable and casing are wound on the drum, it will occupy all the space between the cable and the drum, and said chocking members comprising nesting portions for forming a nesting fit one within the other when they are assembled over a central portion of the casing about which they are adapted to be fitted, the external surfaces of the chocking members being shaped to form a smooth joint at the center of the casing when assembled thereover with the nesting portions fitted together.

2. A device according to claim 1, wherein said nesting portions comprise ends of the chocking members which are shaped to overlap.

3. A device according to claim 1, wherein each chocking member comprises a sleeve of a strong and flexible material having very low compressibility in the radial direction.

* * * * *